United States Patent [19]

Euverard et al.

[11] 4,343,583
[45] Aug. 10, 1982

[54] CONTINUOUS CHAIN STACKER/UNSTACKER

[75] Inventors: Maynard R. Euverard, Williamsburg, Va.; Henry A. Heide, Addison; James J. Diver, South Holland, both of Ill.

[73] Assignee: Velten & Pulver, Inc., Chicago Ridge, Ill.

[21] Appl. No.: 169,444

[22] Filed: Jul. 16, 1980

Related U.S. Application Data

[62] Division of Ser. No. 839,456, Oct. 5, 1977, Pat. No. 4,303,365.

[51] Int. Cl.³ .................... B65G 67/04; B65H 29/18
[52] U.S. Cl. ..................................... 414/75; 414/122; 294/65.5
[58] Field of Search ............... 414/30, 32, 43, 50, 414/53, 70, 71, 74, 75, 78, 97, 117, 120, 122, 121; 294/65.5; 198/343, 799, 812, 370, 862, 679, 422

[56] References Cited

U.S. PATENT DOCUMENTS

| | | | |
|---|---|---|---|
| 1,669,060 | 5/1928 | Livingston | 198/799 |
| 2,632,557 | 3/1953 | Lindberg | 198/862 |
| 3,180,522 | 4/1965 | Marasso | 414/122 X |
| 3,256,970 | 6/1966 | Fievet | 198/343 |
| 3,351,174 | 11/1967 | Wommelsdorr et al. | 198/343 |
| 3,517,835 | 6/1970 | Temple | 294/65.5 X |
| 3,732,970 | 5/1973 | Naranishi et al. | 198/812 X |
| 3,765,546 | 10/1973 | Westerling | 414/37 |
| 3,912,070 | 10/1975 | Cronu et al. | 198/477 |
| 3,933,254 | 1/1976 | Pulver et al. | 414/37 |
| 4,055,257 | 10/1977 | Krebs | 414/78 |

FOREIGN PATENT DOCUMENTS 845774  8/1960  United Kingdom ............... 198/799

Primary Examiner—Lawrence J. Oresky
Attorney, Agent, or Firm—Dithmar, Stotland, Stratman & Levy

[57] ABSTRACT

A stacker/unstacker for receptacles such as bread pans or baskets or the like includes a pair of laterally spaced-apart endless chains having receptacle carriers mounted therebetween for conveying receptacles between an infeed-outfeed conveyor and the top of a receptacle stack. The conveyor chains are horizontally spaced-apart in a direction perpendicular to the lateral direction with the carriers mounted for rotation about two spaced-apart axes which are respectively fixed with respect to the chains so that the carriers are stably held in a predetermined orientation and undergo only translational movement along the conveyor path. The path has a transfer portion at the top of the stack wherein the carriers and carried receptacles remain stationary for a time during which the carriers are moved between support and release conditions to pick up or deposit receptacles at the top of the stack. Indexing mechanism moves the transfer portion vertically to keep it at the top of the stack as the stack height changes. Magnetic and non-magnetic carriers are provided, as well as several arrangements of the infeed-outfeed conveyor with respect to the stack, and an automatic storage system using the stacker/unstacker.

11 Claims, 18 Drawing Figures

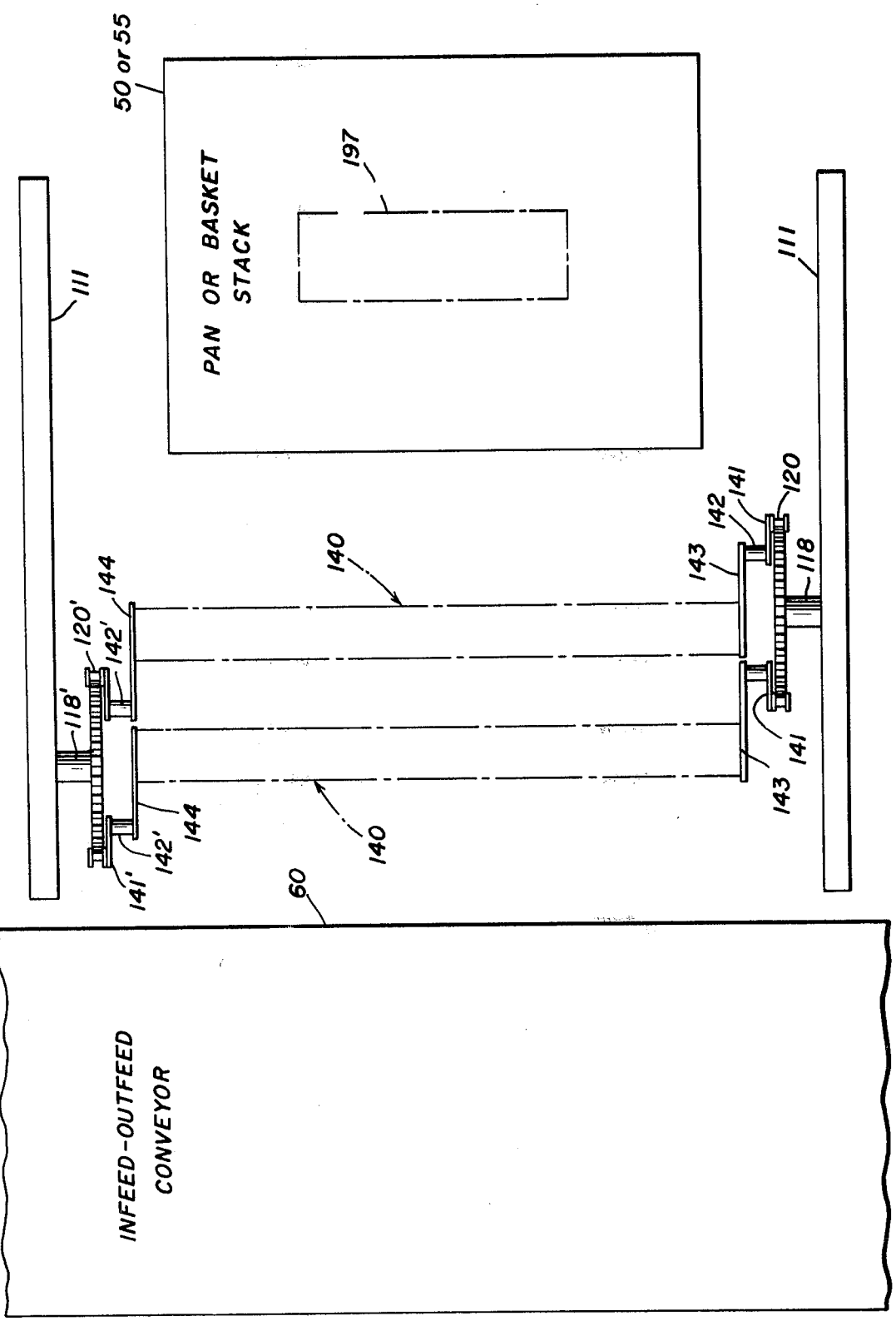

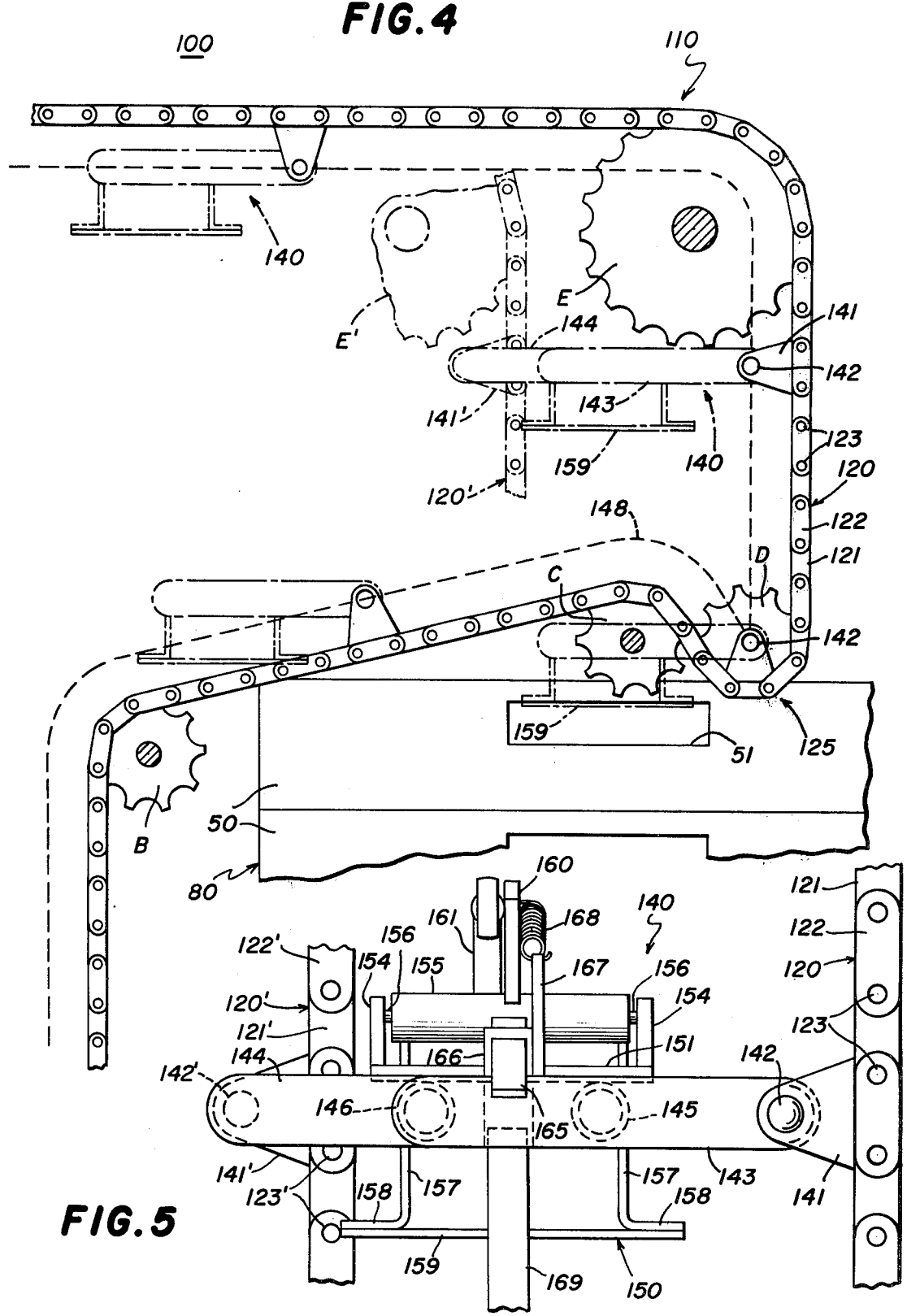

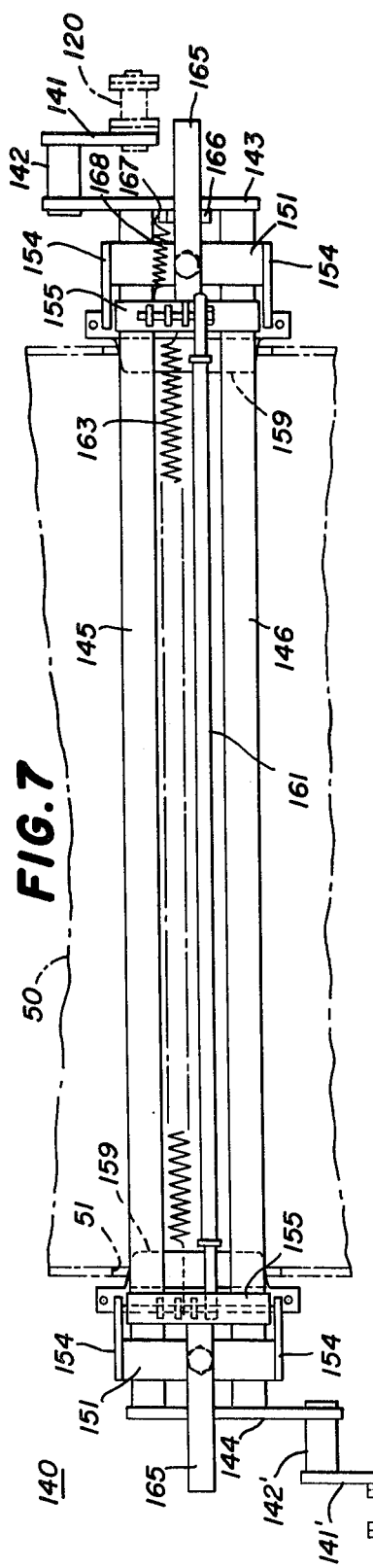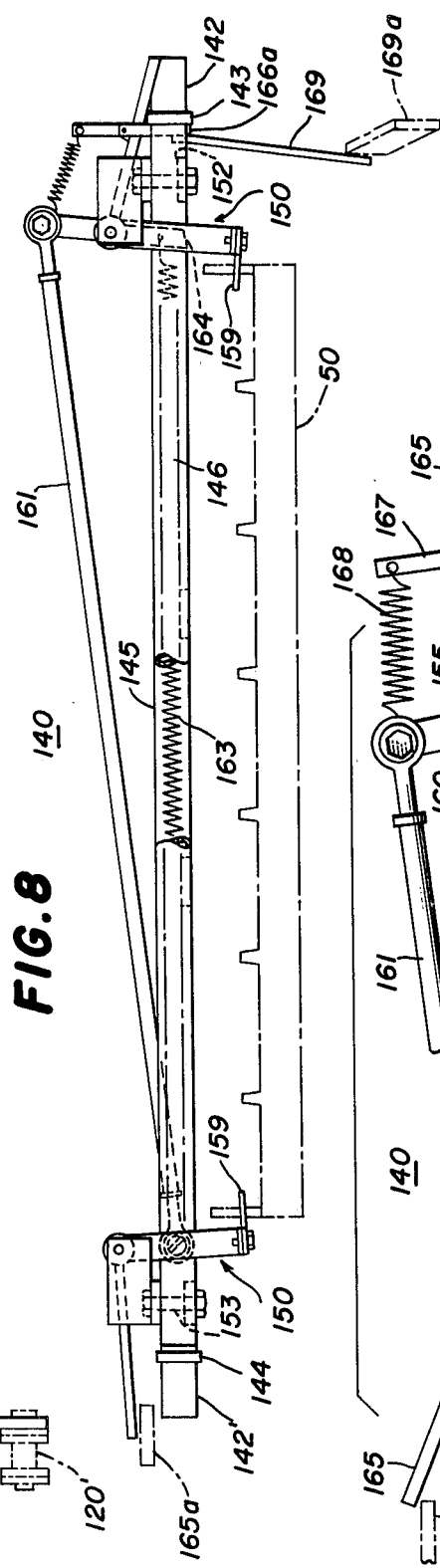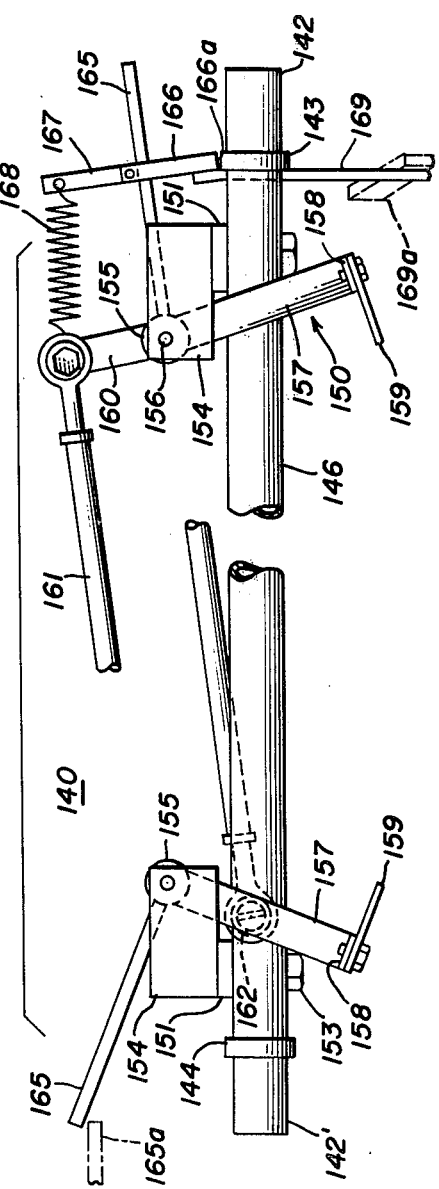

CONTINUOUS CHAIN STACKER/UNSTACKER

This is a division of application Ser. No. 839,456, filed Oct. 5, 1977, now U.S. Pat. No. 4,303,365.

BACKGROUND OF THE INVENTION

The present invention relates to a conveying system, and in particular to a mechanism for feeding articles into a stack and removing articles from a stack.

Stacker/unstacker systems are presently available, one such system being disclosed in U.S. Pat. No. 3,933,254, issued Jan. 20, 1976 to W. C. Pulver et al., and assigned to the assignee of the present invention. The Pulver et al. stacker/unstacker is typical of prior art systems in that it is designed to add articles to a stack or remove articles from a stack at a fixed position at a predetermined elevation. In such systems, it is necessary to move the entire stack up and down during the stacking and unstacking operation to maintain the top of the stack at the fixed position. In the case of bread pans and the like, which are typically formed of fairly heavy gauge ferromagnetic materials and which are typically strapped together in straps of up to six pans, a stack of such pan straps can be quite heavy, often weighing in excess of one thousand pounds per stack. The accurate positioning of such a stack in the prior art systems requires extremely heavyduty and rugged equipment, and the weight of the stacks severely limits the attainable rates of operation.

Furthermore, the prior art stacker/unstacker systems typically include some sort of a conveying system for carrying the receptacles to and from the fixed transfer position at the top of the stack. Because the transfer position is fixed, this conveying necessarily requires an intermittent or reciprocating movement. In the Pulver et al. system, the receptacles are more or less continuously conveyed to a position overlying the top of the stack, and the reciprocating movement is the movement of a magnetic device for vertically shifting the receptacles one at a time between the transfer conveyor and the stack. Such intermittent or reciprocating mechanical movements are necessarily complicated, cumbersome and subject to more frequent breakdown and maintenance expenses than are continuous movement systems.

The design of the prior art stacker/unstacker systems is such that they are necessarily tailored to handling particular types of articles, the systems not being readily adaptable to the handling of other types of articles. Furthermore, the stacks can only be formed on the stacker/unstacker machine itself and, more particularly, on the stack elevator apparatus thereof, thereby greatly limiting the flexibility of the prior art systems.

SUMMARY OF THE INVENTION

In the present invention there is provided a continuous conveyor system which overcomes the deficiencies of the prior art systems as well as providing additional benefits and advantages.

An important feature of the present invention is the provision of a conveyor including an article carrier supported on endless conveyor members so that the carrier undergoes only translational movement along the conveyor path and is prevented from swinging movements.

Another important feature of this invention is the provision of a continuous conveyor for continuously moving articles one at a time to and from an operation position without any intermittent or reciprocating movement, the articles remaining stationary for a time in the operation position while the conveyor continues moving along its path.

Another feature of the present invention is the provision of a stacker/unstacker machine which deposits articles at the top of a stack and removes articles from the top of a stack one at a time without the necessity of moving the entire stack.

In connection with this feature, the present invention conveys articles through a transfer position at the top of the stack, this transfer position being vertically movable to follow the top of the stack as the stack height increases and decreases, while the stack itself remains stationary.

It is another feature of this invention that the continuous conveyor, when used as a stacker/unstacker, includes article or receptacle carriers spaced therealong for supporting the associated articles, the carriers being shiftable between support and release conditions when in the transfer position of the path for picking up or depositing articles at the top of the stack.

Another feature of this invention is the provision of a stacker/unstacker which is capable of simultaneously handling more than one stack of articles.

Yet another feature of this invention is the provision of a storage system utilizing one or more stacker/unstacker machines of the present invention, and wherein articles can recycle past the stacker/unstackers without being handled thereby.

These features are provided and it is an important object of the present invention to attain these advantages by providing a conveyor for moving articles translationally to and from an operation region, the conveyor comprising two laterally spaced-apart parallel endless conveyor members each having a pivot fixed thereon for movement therewith, the conveyor members being respectively movable along parallel paths including operation portions respectively defining arcs of equal parallel circles, the axes of the pivots being spaced apart and parallel so as to define a plane which remains in a predetermined fixed orientation with respect to the horizontal and the vertical as the conveyor members move along the paths, the axes being parallel to the axes of the circles and respectively spaced from the conveyor member paths a distance equal to the radii of the circles so as to be respectively coaxial with the circles when the adjacent parts of the conveyor members are in the operation portions of the paths, and an article carrier supported by and between the conveyor members for pivotal movement only with respect to the pivot axes, whereby the carrier is stably held in a fixed position with respect to the plane for only translational movement with the conveyor members along the paths and as the parts of the conveyor members adjacent to the carrier move through the operation portions of the paths the carrier and any article carried thereby remain stationary in an operation position to facilitate the performance of operations with respect thereto.

Further features of the invention pertain to the particular arrangement of the parts of a stacker/unstacker machine whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 3 is an enlarged fragmentary view in horizontal section taken along the line 3—3 in FIG. 1, and partially in diagrammatic form;

FIG. 4 is a further enlarged fragmentary side elevational view of the transfer portion of the conveyor of the present invention;

FIG. 5 is a still further enlarged end elevational view of one of the receptacle carriers of the present invention;

FIG. 7 is a reduced top plan view of the receptacle carrier illustrated in FIG. 5;

FIG. 8 is a side elevational view of the receptacle carrier of FIG. 7 with the portions thereof broken away;

FIG. 9 is an enlarged fragmentary view similar to FIG. 8, but with the central portion of the receptacle carrier broken away;

DESCRIPTION OF THE PREFERRED EMBODIMENTS

Figure 1:
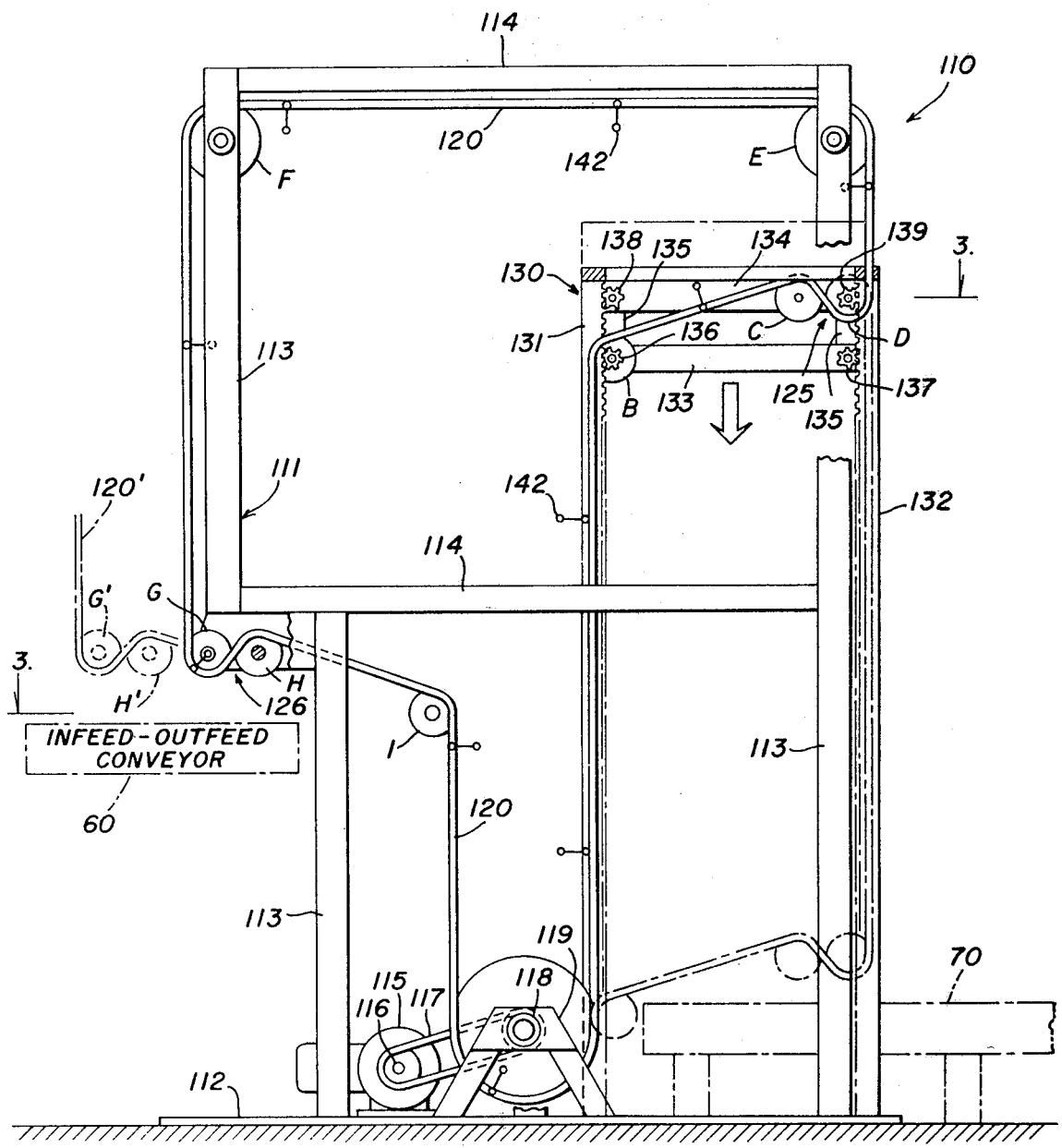
FIG. 1 is a side elevational view, partially in diagrammatic form, of the stacker/unstacker machine of the present invention, with portions thereof removed more clearly to illustrate the construction thereof.
Figure 2:
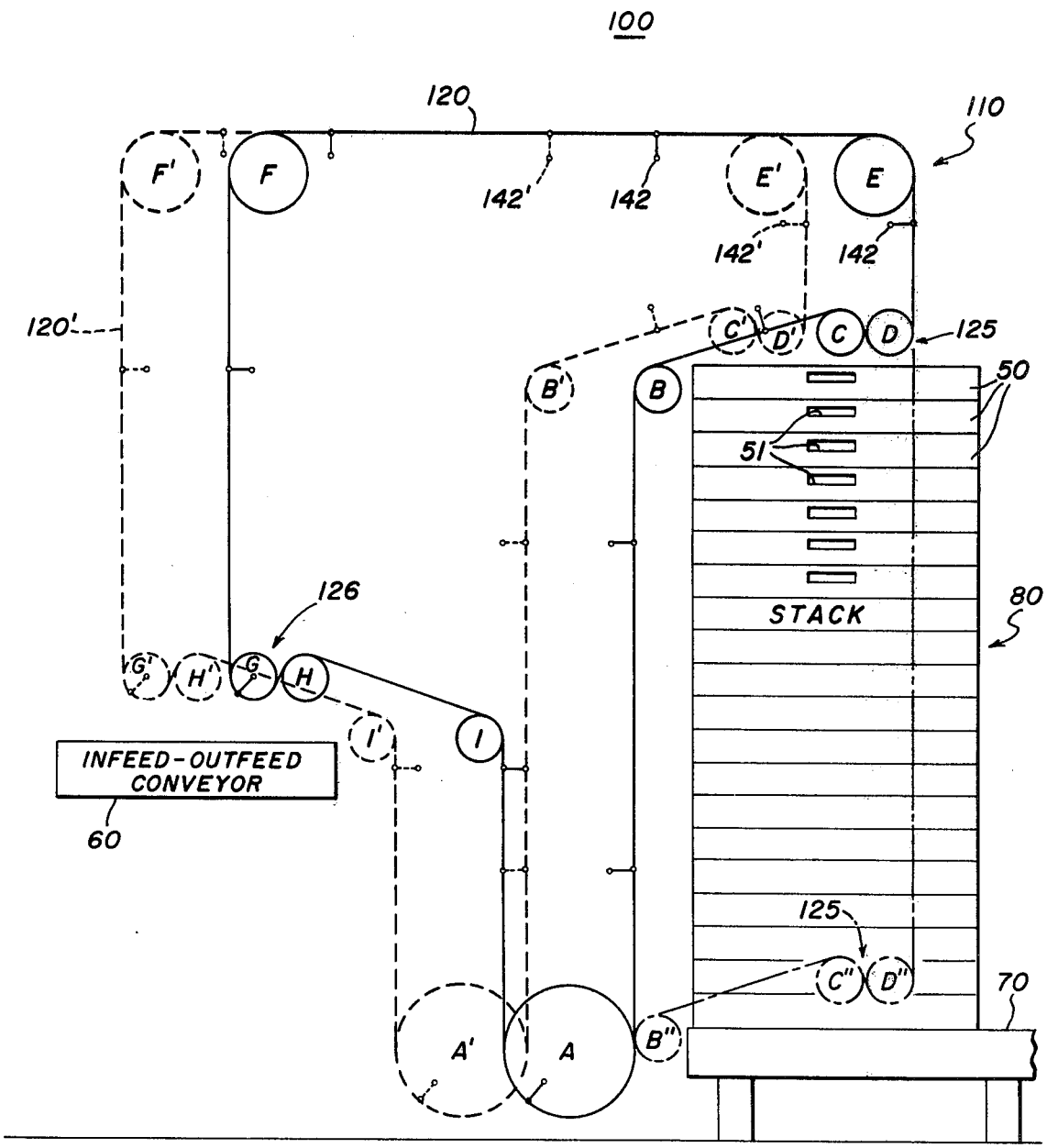
FIG. 2 is a diagrammatic view similar to FIG. 1, illustrating the paths of the two spaced-apart chains of the continuous chain conveyor of the present invention.

Referring now to FIGS. 1 and 2 of the drawings, there is illustrated a stacker/unstacker machine, generally designated by the numeral 100, for conveying receptacles such as bread baskets 50 between an infeed-outfeed conveyor 60 and a platform 70, the stacker/unstacker 100 being operable in a stacking mode for conveying the baskets 50 from the infeed-outfeed conveyor 60 to the top of a stack 80 formed on the platform 70, and being operable in an unstacking mode for conveying baskets 50 from the top of the stack 80 to the infeed-outfeed conveyor 60. More particularly, the stacker/unstacker 100 includes a transfer conveyor, generally designated by the numeral 110, which is supported on a frame 111 comprising a base 112 and a plurality of upstanding posts 113 interconnected by beams 114. Mounted on the frame 111 is a drive motor 115 having an output shaft 116 which is connected, as by a drive belt or chain 117, to a sprocket shaft 118 carried by stanchions 119 on the frame 111.

The transfer conveyor 110 includes a pair of laterally spaced-apart endless conveyor chains 120 and 120', as diagrammatically illustrated in FIG. 2 and, therefore, the frame 111 includes two laterally spaced-apart portions, only one of which is illustrated in FIG. 1, for respectively supporting the two chains 120 and 120'. The frame 111 carries a plurality of sprockets for guiding the chains 120 and 120' respectively along identically-shaped paths which respectively lie in laterally spaced-apart vertical planes, the paths being horizontally offset with respect to each other a predetermined distance in a direction parallel to the planes of the chain paths, as illustrated in FIG. 2. Thus, the chain 120 is guided around a large drive sprocket A connected to the sprocket shaft 118, and thence upwardly and over guide sprockets B and C and under a transfer sprocket D adjacent to the top of the stack 80. Then, the chain 120 is guided upwardly over guide sprockets E and F, and then downwardly beneath a transfer sprocket G overlying the infeed-outfeed conveyor 60. The chain 120 is then guided over guide sprockets H and I and back to the drive sprocket A to complete the endless loop. The chain 120' is similarly guided by sprockets A' through I' which respectively correspond to the sprockets A through I. Preferably, the drive motor shaft 116 extends laterally of the stacker/unstacker 100 (into the paper, as viewed in FIG. 1) and is coupled at the other end thereof by another drive belt or chain (not shown) to the drive sprocket A' for simultaneously driving the chains 120 and 120' at the same speed.

Referring also to FIGS. 4 and 5 of the drawings, the chains 120 and 120' are preferably of identical construction. Thus, the chain 120 includes laterally spaced-apart pairs of inner links 121 respectively overlapping with laterally spaced-apart pairs of outer links 122, the overlapping ends of the inner and outer links 121 and 122 being pivotally interconnected by pins 123. In like manner, the chain 120' includes inner and outer links 121' and 122' interconnected by pins 123', all in a well-known manner. Preferably, the transfer sprockets D, D', G and G' and the guide sprockets B, B', C, C', H, H', I and I' are all of substantially the same diameter, while the guide sprockets E, E', F and F' are of a somewhat larger diameter and the drive sprockets A and A' are of a still larger diameter, it being understood that sprocket size may vary with operational requirements and, in some cases, sprockets may be replaced with suitable guide shoes. While the drive motor 115 has been illustrated at the bottom of the transfer conveyor path, it will be appreciated that it could be situated anywhere else along the closed loop path.

The part of the transfer conveyor path which extends around the transfer sprockets D and D' defines a transfer portion, generally designated by the numeral 125, while the part of the path which extends around the transfer sprockets G and G' defines a transfer portion, generally designated by the numeral 126. In use, the transfer portions 125 and 126 are disposed, respectively, at the top of the stack 80 and immediately above the infeed-outfeed conveyor 60.

Referring to FIG. 1, there is preferably mounted on the frame 111 an index mechanism, generally designated by the numeral 130, for effecting vertical movement of the transfer portion 125 so that it will remain at the top of the stack 80 as the height of the stack 80 changes. More particularly, the index mechanism 130 includes two pairs of vertically extending racks 131 and 132, one pair for each of the chains 120 and 120', one of the rack pairs being illustrated in FIG. 1. Spanning the racks 131 and 132 are two horizontally extending and vertically spaced-apart sprocket beams 133 and 134, the opposite ends of which are interconnected by posts 135 so that the sprocket beams 133 and 134 move as a unit. Mounted adjacent to one end of the beam 133 is a pinion 136 disposed for meshing engagement with the rack 131, while mounted adjacent to the other end of the beam 133 is a pinion. 137 disposed for meshing engagement with the rack 132. In like manner, a pinion 138 is disposed adjacent to one end of the beam 134 for meshing engagement with the rack 131. Mounted adjacent to the other end of the beam 134 is a pinion 139 disposed for meshing engagement with the rack 132. The guide sprockets B, C and D are also mounted on the index mechanism 130 for vertical movement therewith in unison and for rotation independently of the pinions 136–139 as the index mechanism 130 raises and lowers. It will be understood that the sprockets B', C' and D' are similarly mounted on the index mechanism 130 for vertical movement along the other pair of racks.

Also mounted on the index mechanism 130 are suitable drive means and control means (not shown) for effecting vertical movement thereof. The control means is such that each time a receptacle is deposited on the top of the stack 80, the index mechanism 130 operates to raise the transfer portion 125 a distance equal to the increase in the height of the stack by the addition of the last receptacle thereto, so that the transfer portion 125 will again be properly positioned at the top of the stack for depositing the next receptacle conveyed by the transfer conveyor 110. In like manner, each time a receptacle is removed from the top of the stack, the index mechanism 130 is operated to lower the transfer portion 125 a distance equal to the decrease in the height of the stack by the removal of the last receptacle. Thus, the transfer portion 125 can be moved between the solid line and broken line positions illustrated in FIGS. 1 and 2, i.e., a distance corresponding to the maximum height of the stack 80.

Referring now also to FIGS. 3 through 9 of the drawings, there are mounted on the transfer conveyor 110 a plurality of equidistantly spaced-apart receptacle carrier assemblies, each generally designated by the numeral 140, which extend laterally between the chains 120 and 120'. The receptacle carrier assemblies 140 are identically constructed, each including a pair of mounting plates 141 and 141' which are respectively mounted on the inner surfaces of the chains 120 and 120'. Each of the mounting plates 141 and 141' is generally triangular in shape having a pair of apertures through the base thereof for respectively receiving an associated pair of chain link pins 123 or 123', with the apices of the mounting plates 141 and 141' respectively extending inwardly of the closed chain loops. Respectively carried by the mounting plates 141 and 141' adjacent to the apices thereof are laterally inwardly extending, horizontal pivot bearings 142 and 142', the axes of which are parallel and spaced apart the same distance and direction as the displacement of the chains 120 and 120' to define a horizontal plane. Thus, it will be appreciated that the mounting plates 141 and 141' are respectively fixed with respect to the corresponding chains 120 and 120', each mounting plate 141 or 141' extending inwardly in a direction substantially normal to a line interconnecting the chain pins on which the plate is mounted.

Respectively coupled to the pivot bearings 142 and 142' are a pair of elongated end plates 143 and 144, each having one end thereof freely pivotally mounted on the associated pivot bearing 142 or 142' and having the other end thereof extending toward the other chain in the direction of displacement of the chains 120 and 120', so that the end plates 143 and 144 are disposed substantially parallel to each other with the distal end portions thereof overlapping. Interconnecting the overlapping portions of the end plates 143 and 144 are two laterally extending parallel crossbars 145 and 146 which are spaced apart in the direction of displacement of the chains 120 and 120' and which have the axes thereof disposed substantially coplanar with the axes of the pivot bearings 142 and 142'.

It will be understood that the combination of the end plates 143 and 144 and the crossbars 145 and 146 forms a rigid framework for the receptacle carrier assembly 140, which is horizontally disposed between the chains 120 and 120' for pivotal movement about the axes of the pivot bearings 142 and 142'. Thus, as the conveyor chains 120 and 120' move along the path of the transfer conveyor 110, the framework of the receptacle carrier assembly 140 will remain horizontally disposed and will undergo only a translational movement along the path of the transfer coveyor 110. The double pivot mounting of the receptacle carrier assembly 140 maintains it in its horizontal position while the conveyor chains 120 and 120' change direction along the conveyor path, but maintain the receptacle carrier assembly 140 stable and prevent swinging movement thereof. Because the pivot bearings 142 and 142' are respectively fixed with respect to the chains 120 and 120', they respectively move along paths 148 and 148' which are indicated in broken line in FIGS. 4 and 6 and which are respectively parallel to the chains 120 and 120'.

The receptacle carrier assembly 140 includes two support mechanisms at the opposite ends thereof, each generally designated by the numeral 150, which are substantially identical in construction. Each of the support mechanisms 150 includes a mounting bracket 151 overlying and spanning the adjacent ends of the crossbars 145 and 146 and an anchor plate 152 secured to the mounting bracket 151 by a bolt 153 and cooperating therewith fixedly to position the mounting bracket 151 on the crossbars 145 and 146. Extending upwardly from the opposite ends of the mounting bracket 151 are two parallel pivot arms 154 cooperating to support therebetween a pivot roll 155 for rotational movement with respect to spindles 156. Fixedly secured to the pivot roll 155 adjacent to the opposite ends thereof and extending downwardly therefrom are two support arms 157, each terminating at the lower end thereof in an outturned support flange 158. Spanning the flanges 158 and fixedly secured thereto is a support finger plate 159 which extends laterally inwardly of the support mechanism 150 for engagement in a handle aperture 51 (see FIGS. 4 and 6) at the adjacent end of an associated receptacle. Thus, as will be explained more fully below, the support finger plates 159 of the support mechanisms 150 cooperate to grip therebetween an associated receptacle, such as a basket 50.

Fixedly secured to one of the pivot rolls 155 intermediate the ends thereof and extending upwardly therefrom is an extension arm 160, the upper end of which is pivotally coupled to an elongated tie rod 161 which extends laterally of the receptacle carrier assembly 140 and has the other end thereof pivotally coupled to a cross brace 162 which spans the support arms 157 of the other support mechanism 150 beneath the pivot roll 155 thereof. Also connected to the cross brace 162 is one end of a helical tension spring 163, the other end of which is anchored on an extension leg 164 which extends downwardly from the pivot roll 155 of the other support mechanism 150 generally diametrically opposite to the extension arm 160 thereof. Thus, it will be understood that the tension spring 163 serves resiliently to urge the right-hand pivot roll 155, as viewed in FIG. 8, toward clockwise rotation about the axis of the associated pivot roll 155, which movement serves, by action of the tie rod 161, to urge the support arms 157 of the other support mechanism 150 toward rotation in a counterclockwise direction, as viewed in FIG. 8. Thus, the support finger plates 159 are resiliently urged toward a supporting configuration projecting inwardly toward each other, as illustrated in FIGS. 7 and 8 of the drawings for supporting engagement with the opposite ends of a basket 50 or the like.

Respectively fixedly secured to the pivot rolls 155 and extending outwardly therefrom substantially normal to the axes thereof toward the adjacent ends of the receptacle carrier assembly 150 are two control levers 165. The control lever 165 at the right-hand end of the receptacle carrier assembly 140, as viewed in FIGS. 7-9, extends through a complementary aperture in a latch block 166 which is provided at the lower end thereof with a latch shoulder 166a. Fixedly secured to the latch block 166 and extending upwardly therefrom at one side thereof is an extension bar 167, the upper end of which is connected by a tension spring 168 to the upper end of the extension arm 160. Fixedly secured to the latch block 166 adjacent to the lower end thereof and extending downwardly therefrom between the crossbars 145 and 146 is an elongated control lever 169.

When the support mechanisms 150 are in the support configuration thereof illustrated in FIG. 8, the latch block 166 is disposed alongside the inner surface of the end plate 143, with the associated control lever 165 resting on top of the end plate 143 and extending outwardly therebeyond. Similarly, the other control lever 165 overlies the end plate 144 and extends outwardly therebeyond. When the stacker/unstacker 100 is operating in the stacking mode, the chains 120 and 120' are rotating in a clockwise direction, as viewed in FIG. 4, and as the receptacle carrier assembly 140 approaches the transfer portion 125 from above, either or both of the control levers 165 engage fixed cam members 165a (see FIGS. 8 and 9) for pivoting them upwardly and thereby pivotally shifting the support arms 157 outwardly to move the support mechanisms 150 to a releasing condition, illustrated in FIG. 9, wherein the support finger plates 159 are disposed out of engagement with the associated receptacle for releasing it and depositing it at the top of the associated stack 80. As the right-hand one of the control levers 165 moves upwardly, it carries with it the latch block 166, the lower end of which is urged outwardly against the end plate 143 by the action of the tension spring 168. Thus, when the latch shoulder 166a reaches the top of the end plate 143, it snaps over the top of it, with the control lever 169 lying along the inner surface of the end plate 143 for latching the support mechanism 150 in its release configuration illustrated in FIG. 9.

When the stacker/unstacker 100 is operating in the unstacking mode, the conveyor chains 120 and 120' move along the closed loop path in a counterclockwise direction, as viewed in FIG. 4. In this mode, the support mechanisms 150 are normally latched in their release configuration, and as the receptacle carrier assembly 140 moves into the transfer portion 125 of the conveyor path, the control lever 169 engages an inwardly angled and upwardly inclined cam member 169a (see FIG. 9) for moving the control lever 169 laterally inwardly and away from the end plate 143 to move the latch shoulder 166a off the top of the end plate 143, thereby permitting the support mechanisms 150 to move back to the support configuration thereof under the urging of the tension spring 163 for engaging the receptacle at the top of the stack 80 and picking it up as the receptacle carrier assembly 140 moves out of the transfer portion 125 of the conveyor path.

Figure 6:
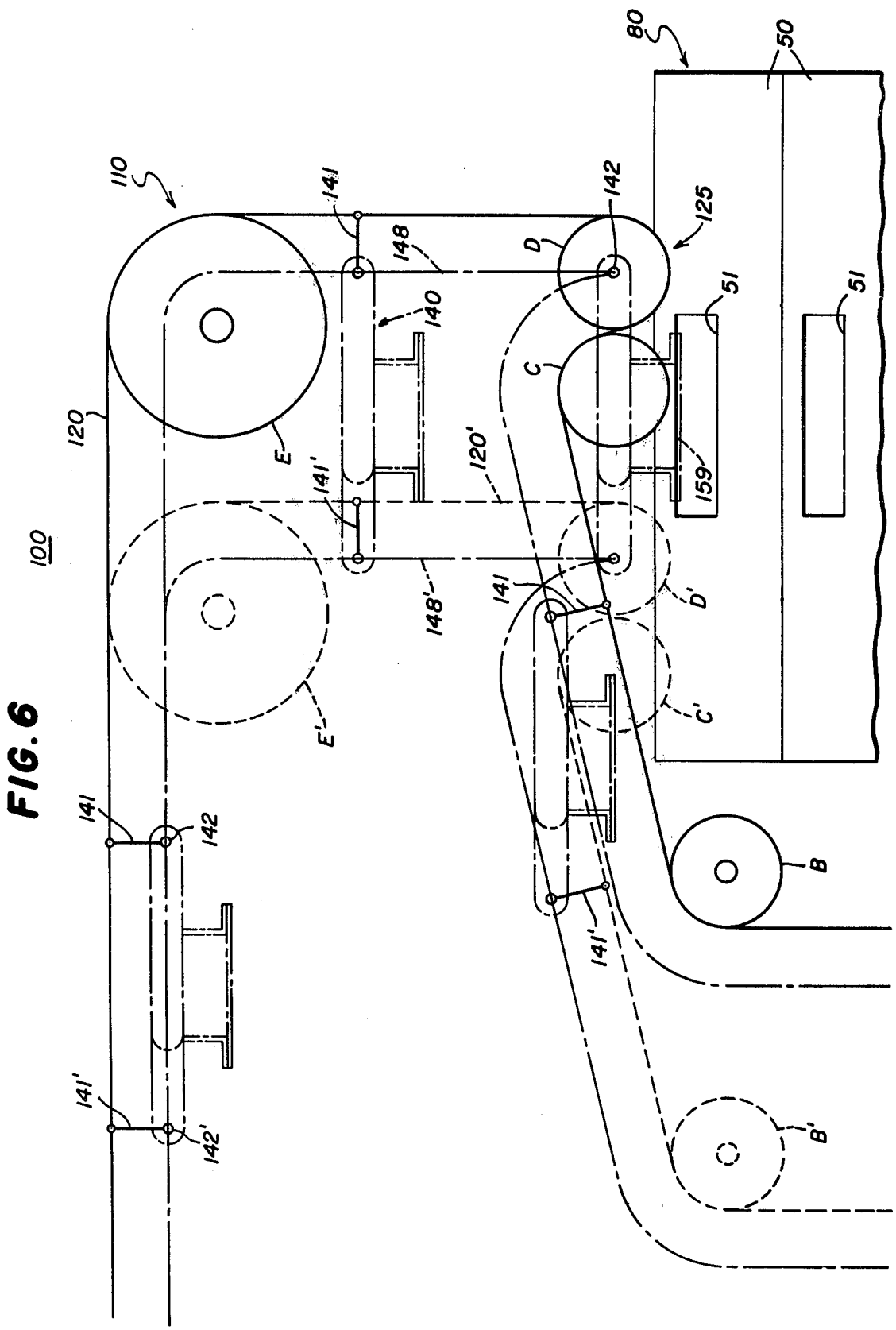
FIG. 6 is a view similar to FIG. 4, but in diagrammatic form, illustrating the paths of the receptacle carriers along the transfer portion of the conveyor of the present invention.

Referring in particular to FIGS. 4 and 6 of the drawings, it is a significant feature of the present invention that the receptacles can be deposited on or removed from the top of the stack 80 without any intermittent or reciprocal movement of the transfer conveyor 110 and, furthermore, that the transfer of receptacles to or from the top of the stack can be effected without interrupting the continuous movement of the conveyor chains 120 and 120' along the conveyor path. To this end, it will be noted that the axes of the transfer sprockets D and D' are parallel to the axes of the pivot bearings 142 and 142', and the radii of the transfer sprockets D and D' are equal to the distance from the axes of the pivot bearings 142 and 142' to the line interconnecting the axes of the chain pins on which the corresponding mounting plate 141 is mounted. In other words, the axes of the pivot bearings 142 and 142' move along paths 148 and 148' which are spaced from the chains 120 and 120' a distance equal to the radius of the transfer sprockets D and D'. Thus, it will be appreciated that as the chains 120 and 120' move along the circumferences of the transfer sprockets D and D', the pivot bearings 142 and 142' will remain in stationary transfer positions coaxial with the transfer sprockets D and D'.

The transfer portion 125 of the conveyor path is that portion wherein the chain paths lie along the circumferences of the transfer sprockets D and D' and, therefore, it will be understood that, in this transfer portion 125 of the path, the receptacle carrier assembly 140 will remain stationary while the chains 120 and 120' continue moving. This stopping of the receptacle carrier assembly 140 in the transfer position permits movement of the support mechanisms 150 between the support and release conditions thereof for engaging and disengaging associated receptacles 50 at the top of the stack 80.

In like manner, referring to FIGS. 1 and 2 of the drawings, the transfer portion 126 of the conveyor path is that portion wherein the conveyor chains 120 and 120' move along the circumferences of the transfer sprockets G and G', which sprockets have the same radii as the transfer sprockets D and D'. Thus, in the transfer portion 126 of the conveyor path, the receptacle carrier assembly 140 will remain stationary while the conveyor chains 120 and 120' continue moving, this stopping of the receptacle carrier assembly 140 permitting movement of the support mechanisms 150 between the release and support configurations thereof for picking receptacles up from and depositing receptacles on the infeed-outfeed conveyor, depending upon whether the stacker/unstacker 100 is operating in the stacking or the unstacking mode.

It will be understood that the positioning of the guide sprockets C, C', H and H' determines the length of the transfer portions 125 and 126 of the conveyor path, these sprockets being positioned in the preferred embodiment so that the transfer portions 125 and 126 of the conveyor path represent approximately one-half the circumferences of the transfer sprockets D, D', G and G'. The diameters of the guide sprockets E, E', F and F' are larger than the diameters of the other guide and transfer sprockets, because these former guide sprockets are located at 90-degree corners of the conveyor path in which the receptacle carrier assemblies 140 move abruptly between horizontal and vertical directions of travel, and the larger sprocket diameters of these corners serve to reduce the rate of acceleration of the receptacle carrier assemblies 140 between the horizontal and vertical directions of travel. The still larger diameter of the drive sprockets A and A' provides clearance for the carrier assemblies' 140 direction reversal at this portion of the conveyor path. Thus, referring to FIG. 3, which is a horizontal sectional view looking down on the drive sprockets A and A', it will be understood that as the receptacle carrier assembly 140 adjacent to the stack 80 is moving upwardly (out of the page), the receptacle carrier assembly 140 adjacent to the infeed-outfeed conveyor 60 will be moving downwardly (into the page), and vice versa.

Another significant feature of the present invention is that receptacles can be deposited on or removed from the top of a stack without having to move the entire stack, this being accommodated by the index mechanism 130 which, as described above, permits movement of the transfer portion 125 of the conveyor path with respect to the stack so that the transfer portion 125 can always be positioned at the top of the stack. This mode of operation for stacking and unstacking without stack movement permits stacking and unstacking on any desired support surface. Thus, since no stack elevator apparatus is necessary, the stack 80 may, for example, be formed on a loading dock, a forklift truck, a dolly or the like. Thus, referring to FIG. 2, the transfer portion 125 of the conveyor path may be moved between the position illustrated in solid line and the position illustrated in broken line, the latter being at the bottom of the stack with the positions of the sprockets B, C and D respectively being designated as B'', C'' and D''. It can readily be seen that the stacker/unstacker 100 of the present invention can be fixedly located on the floor and that stacks of receptacles can be brought to it either on trucks or automatic conveyors when operating as an unstacker, or it can place the receptacles on trucks, dollies or automatic conveyors when acting as a stacker. It will also be appreciated that the stacker/unstacker 100 could also be mounted on a track or otherwise made mobile so that it could be placed alongside automatic storage lanes or the like for either receiving stacks of receptacles from such lanes or forming stacks of receptacles in such lanes, as will be explained more fully hereinafter.

It will be understood that a plurality of the receptacle carrier assemblies 140 are carried by the transfer conveyor 110 at equidistantly spaced-apart points therealong. Thus, the total chain length is preferably an integral multiple of the spacing between adjacent receptacle carrier assemblies 140, which spacing is preferably a multiple of two times the chain pitch.

Figure 10:
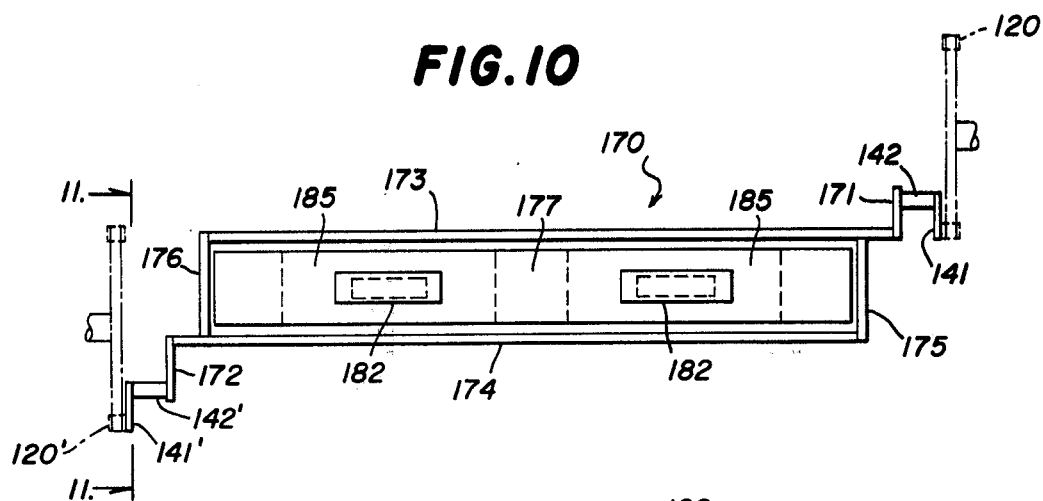
FIG. 10 is a top plan view of a receptacle carrier constructed in accordance with a second embodiment of the present invention.
Figure 11:
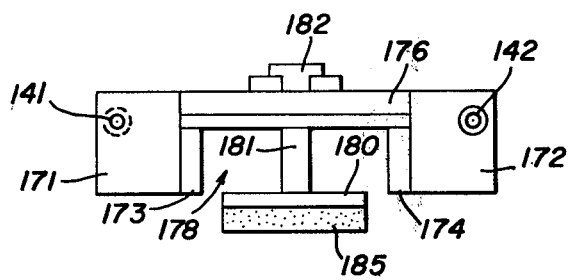
FIG. 11 is an end elevational view taken along the line 11—11 in FIG. 10.

Referring now also to FIGS. 10 and 11 of the drawings, there is illustrated an alternative form of receptacle carrier assembly, generally designated by the numeral 170, for carrying receptacles such as bread pans or the like which are either formed entirely of a ferromagnetic material or which at least have a magnetizable portion thereon. The carrier assembly 170 is mounted on mounting plates 141 and 141' with pivot bearings 142 and 142' in essentially the same manner as was described above with respect to the receptacle carrier assembly 140. More particularly, the carrier assembly 170 includes a pair of parallel bearing plates 171 and 172 which are respectively disposed substantially parallel to the mounting plates 141 and 141', and each is pivotally mounted at one end thereof on the associated pivot bearing 142 or 142', with the distal end thereof extending in the direction of displacement of the chains 120 and 120' toward the other of said chains. Supported between the bearing plates 171 and 172 is a framework comprising a pair of laterally extending parallel side plates 173 and 174 interconnected adjacent to the ends thereof by transversely extending end plates 175 and 176 to form a generally rectangular framework. More particularly, the side plate 173 is fixedly secured to the bearing plate 171 while the side plate 174 is fixedly secured to the bearing plate 172.

There is also provided a flat, generally rectangular top plate 177 overlying the plates 173–176, which plates are open at the bottom edges thereof for cooperation to define therebetween a recess or well 178 in which are received one or more magnet holders 180. Each of the magnet holders 180 is provided with an upwardly extending support arm 181 which extends through a complementary opening in the top plate 177 and is provided at the upper end thereof with an enlarged support head 182 which overlies the top plate 177 to support the magnet holder 180 thereon. Fixedly secured to the underside of each magnet holder 180 is a suitable magnet 185. In use, the support arms 181 are slidably movable with respect to the top plate 177 for accommodating movement of the magnet 185 into and out of the well or recess 178. In the embodiment illustrated in FIGS. 10 and 11, two of the magnet holders 180 are disclosed in laterally spaced-apart relationship.

In use, the carrier assembly 170 is supported in the same manner as was described above with respect to the receptacle carrier assembly 140, so that the carrier assembly 170 is stably held in a horizontal position for pivotal movement about the two spaced-apart axes of the pivot bearings 142 and 142' to limit the carrier assembly 170 to only translational movement along the path of the transfer conveyor 110. In operation, the magnets 185 engage the upper edges or other magnetizable portion of the associated pan or other receptacle for carrying it along the conveyor path. Preferably, control means (not shown) are provided along the path for engagement with the magnet holders 180 to move them vertically with respect to the top plate 176.

Thus, when a receptacle is carried by the carrier assembly 170, and it is desired to disengage it to deposit it at the top of a stack, the control means engage the magnet holder 180 to move it upwardly into the well 178, the upper edges of the receptacle engaging the lower edges of the side plates 173 and 174 and end plates 175 and 176 as the magnet 185 enters the well 178 to strip the pan or receptacle from the magnet 185 and break the magnetic attraction to drop the pan onto the top of the stack. Once the magnetic field on the pan is permitted to drop, it will not again be picked up unless the magnets 185 are brought in actual physical contact therewith. The height of the carrier assembly 170 above the surfaces from which the pans are picked up or onto which they are deposited is carefully adjusted and the control means are so arranged that the magnets 185 may be brought into contact with the pans for pickup but will not reengage a pan after dropoff thereof.

Figure 12:
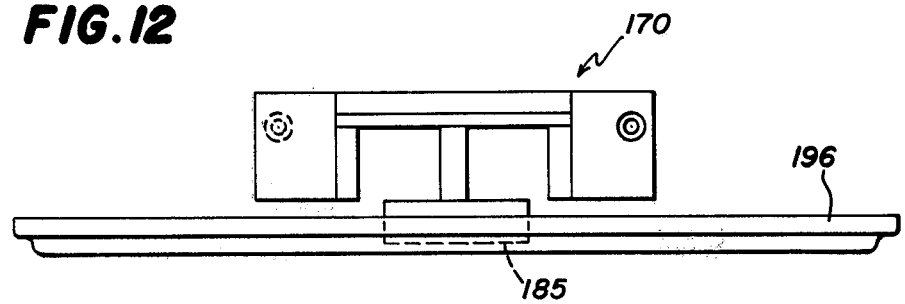
FIG. 12 is a view similar to FIG. 11, of the receptacle carrier thereof illustrated carrying a bun pan.
Figure 13:
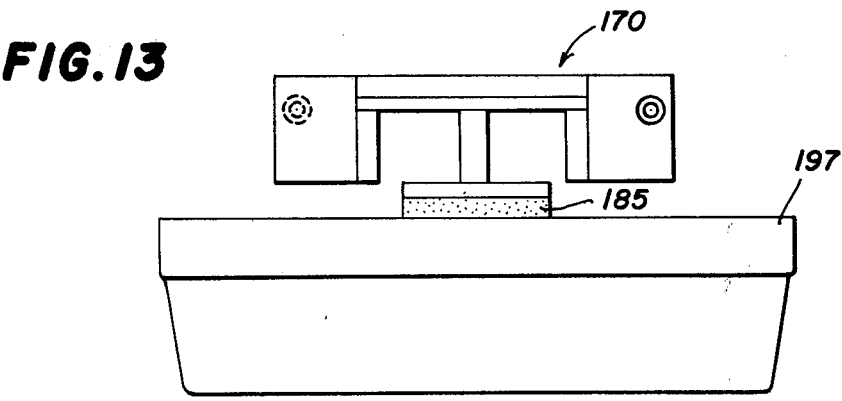
FIG. 13 is a view similar to FIG. 12, with the receptacle carrier shown supporting a bread pan.

Referring now to FIG. 12 of the drawings, the carrier assembly 170 is illustrated with the magnet 185 thereof disposed in supporting engagement with a shallow bun pan 196, while in FIG. 13, the magnet 185 is shown disposed in supporting engagement with a deeper bread pan strap 197. It can be seen that the carrier assembly 170 is adapted to support the bun pan 196 from the inside surface thereof and to support the bread pan strap 197 from the top edges thereof.

It will be understood that the carrier assembly 170 could be utilized with any size or shape of receptacle as long as it has a magnetizable portion for engagement with the magnets 185. Also, the dimensions and arrangement of the magnets 185 and the carrier assemblies 170 may be altered to accommodate different types of articles. Furthermore, it will be appreciated that where plural magnets are provided in the carrier assembly 170, plural receptacles could be simultaneously carried side by side by a single carrier assembly. It will also be appreciated that frequently receptacles such as bread pans or the like are strapped together in groupings of receptacles, up to six in number, and the entire grouping or "strap" can be handled by the carrier assembly 170 as a single unit. In FIG. 3 of the drawings, there is diagrammatically illustrated the relative sizes of receptacles which could be handled by the stacker/unstacker of the present system, varying from the smallest common bread pan strap 197 to the largest common roll pan 55. It will, of course, be understood that other sizes or shapes of receptacles or receptacle groups could be accommodated by appropriate variation of the size of the carrier assemblies 140 or 170 and the spacing of the chains 120 and 120'.

Figure 17:
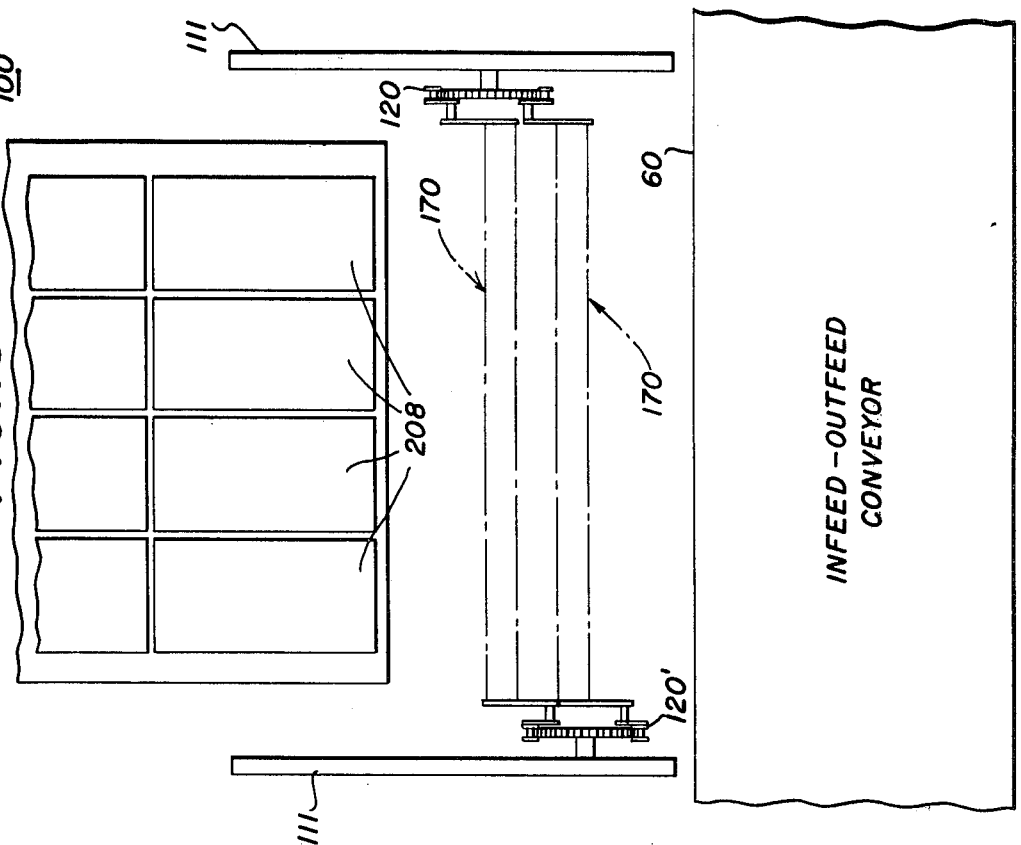
FIG. 17 is a reduced view similar to FIG. 3, and illustrating the use of the stacker/unstacker machine of the present invention for handling a dual receptacle stack.

Referring to FIG. 17 of the drawings, there is illustrated a configuration of the stacker/unstacker 100 for handling receptacles such as bun pans 207 or the like two at a time to form a dual stack. In this arrangement for handling bun pans, the stacker/unstacker 100 is illustrated as being equipped with the magnetic receptacle carrier assemblies 170, preferably provided with two magnets for respectively supporting the two bun pans 207 in side-by-side relationship. In this arrangement, the bun pans 207 may be supported independently of each other or they may be strapped together to form a unit. In the latter case, only a single magnet would be necessary in the receptacle carrier assembly 170.

Figure 18:
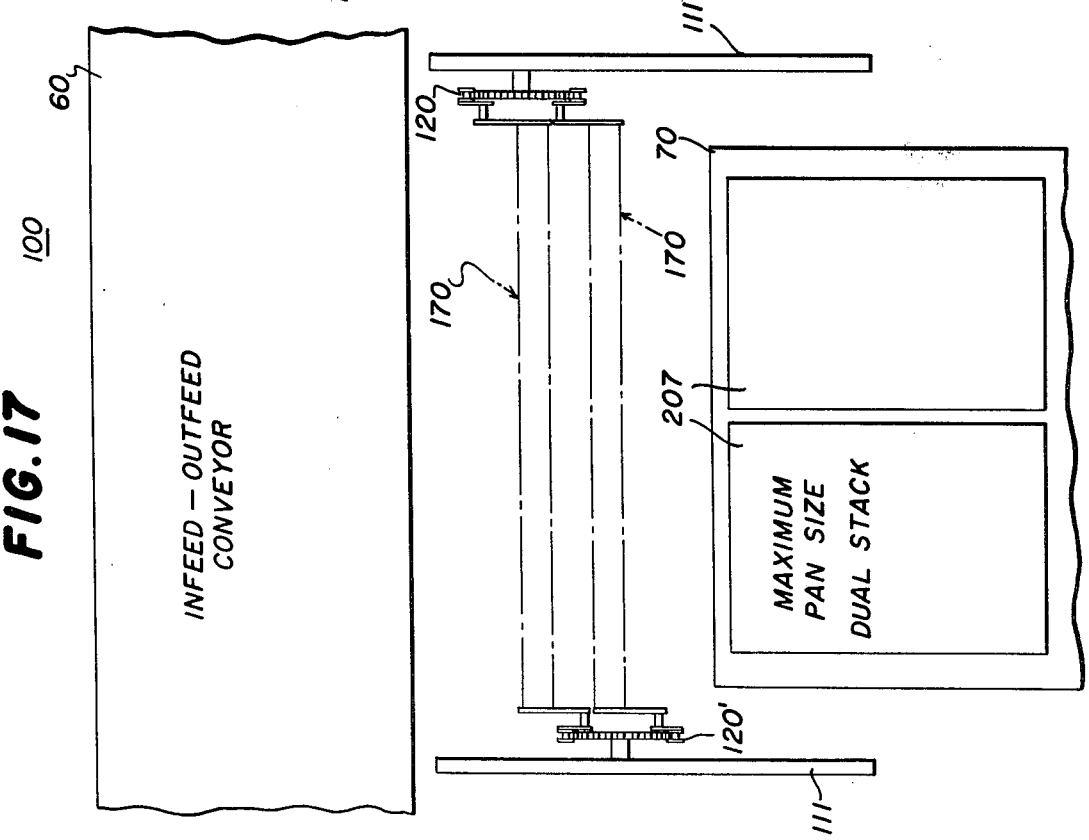
FIG. 18 is a view similar to FIG. 17, and illustrating the use of the stacker/unstacker machine of the present invention for handling a quadruple receptacle stack.

In FIG. 18 there is illustrated an arrangement of the stacker/unstacker 100 wherein it handles four receptacles 208 at a time, the receptacles 208 typically being straps of bread pans or the like. The receptacle carrier assemblies 170 will be provided with the necessary number and size of magnets to support the receptacles 208 four abreast. It will be understood that a significant advantage of the arrangements of FIGS. 17 and 18 is that the rate of stacking and unstacking of the receptacles can be proportionately greater than when the receptacles are being handled one at a time. Similarly, the handling of two or more stacks of receptacles at a time significantly reduces the frequency of handling of the stacks in bringing them to and from the stacker/unstacker 100.

Figure 14:
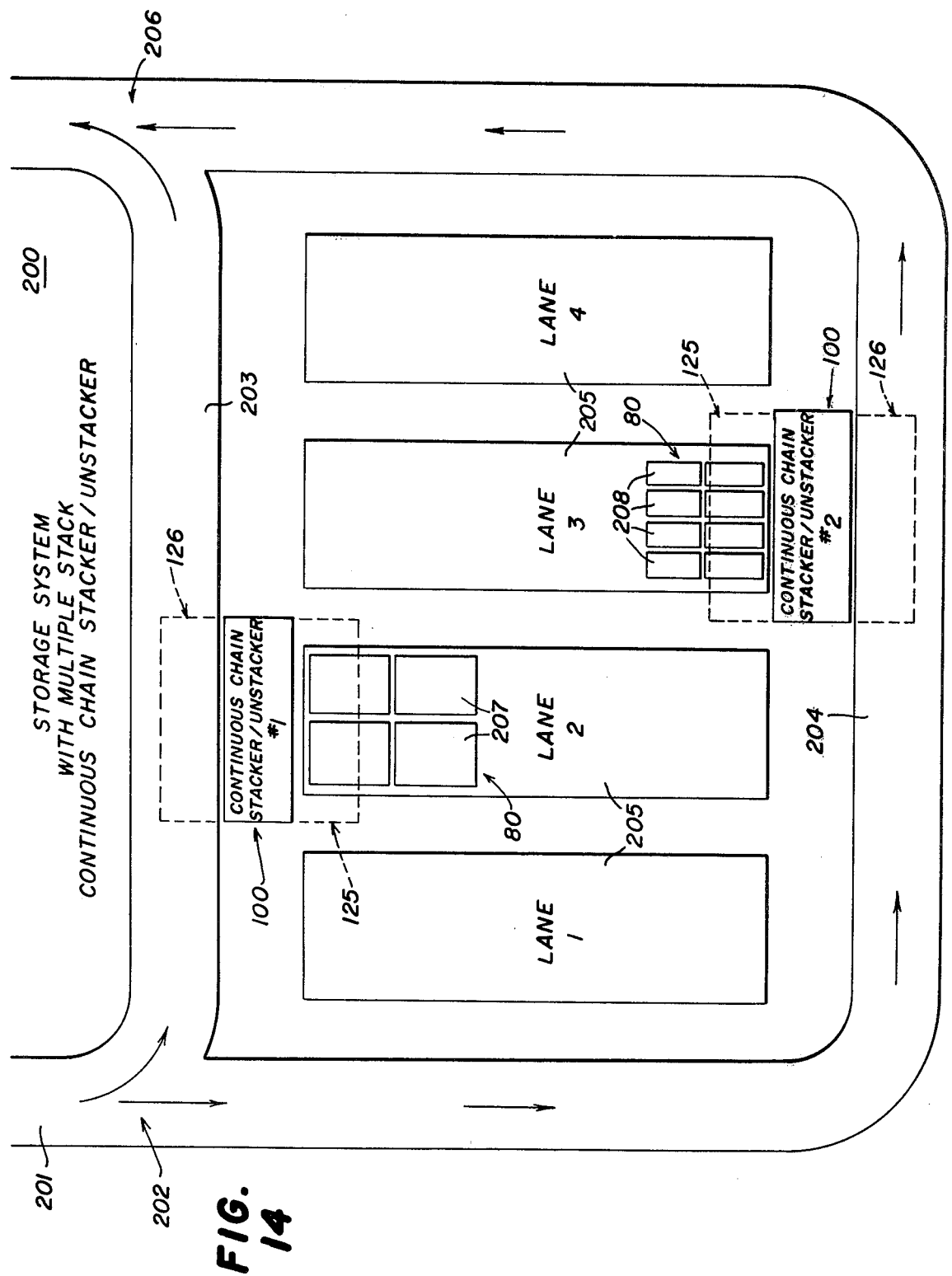
FIG. 14 is a diagrammatic top plan view of a system for storing stacks of receptacles and utilizing two stacker/unstacker machines of the present invention, each capable of handling plural stacks.

Referring now to FIG. 14 of the drawings, there is illustrated a storage system, generally designated by the numeral 200, for storing stacks of receptacles in lanes in a storage area, with the use of stacker/unstackers 100 of the present invention. In the system 200, the individual receptacles, such as baskets, bread pans or the like, move along a track 201 through the various processing stations of a bakery or the like. The track 201 is coupled by a separator switching section 202 to one end of an inner storage loop 203 and an outer storage loop 204, the other ends of which are again joined to the track 201 by a combiner section 206. Arranged in the storage area between the inner and outer loops 203 and 204 are a plurality of storage lanes 205 for storing stacks 80 of receptacles. Preferably, each of these storage lanes is provided with a powered stack conveyor for moving the stacks 80 stored thereon toward either end of the lane. A first stacker/unstacker 100 is movable between the inner storage loop 203 and the adjacent ends of the storage lanes 205, while a second stacker/unstacker 100 is movable between the other ends of the lanes 205 and the outer storage loop 204, the first and second stacker/unstacker 100 being movable longitudinally of the storage loops 203 and 204 for alignment with any of the storage lanes 205. In the embodiment illustrated in FIG. 14, lane 2 has been shown as accommodating dual stacks of maximum size receptacles 207, in the manner described above in connection with FIG. 17, while lane 3 is shown as accommodating groups of four stacks of bread pans 208 or the like, in the manner described above in connection with FIG. 18.

In this configuration, two receptacles 207 at a time are removed by the first stacker/unstacker 100 and fed into the inner storage loop 203 and then via the combiner 206 into the track 201 of the processing system. This operation continues until all receptacles 207 from the uppermost two stacks in lane 2 have been used, and then the lane conveyor is powered to move the next set of stacks forward for unstacking by the first stacker/unstacker 100. This operation continues until the operating system is filled, at which time it is placed in a recycle mode wherein pans returning to the separator 202 are switched into the inner storage loop 203 and simply cycle past the first stacker/unstacker 100. When operation with this particular set of receptacles is completed, the first stacker/unstacker 100 is set in a stacking mode to stack all of the receptacles 207 which return from the track 201 to the inner storage loop 203. When the first two stacks of receptacles 207 have reached their maximum height, the stack conveyor in lane 2 moves rearwardly to make room for the formation of the next two stacks at the end of the lane.

Simultaneously with this, the second stacker/unstacker 100 may be set in the unstacking mode for unstacking receptacles 208 from lane 3, wherein this second type of receptacle then flows into the system via the combiner 206. As the stacks of receptacles 208 are exhausted, the conveyor in lane 3 advances the next group of four stacks for unstacking by the second stacker/unstacker 100. When all of the receptacles 207 have been restacked and the required number of receptacles 208 are in the system, the system is again put in a recycle mode, wherein as the receptacles 208 return to the separator 202, they are fed to the outer storage loop 204 and cycle past the second stacker/unstacker 100. When operation with this set of receptacles is completed, the second stacker/unstacker 100 is set in a stacking mode for restacking the receptacles 208 in lane 3. It will be understood that the first and second stacker/unstackers 100 may be moved from lane to lane to remove receptacles from or store receptacles in any of the several storage lanes 205 from either end thereof.

Figure 15:
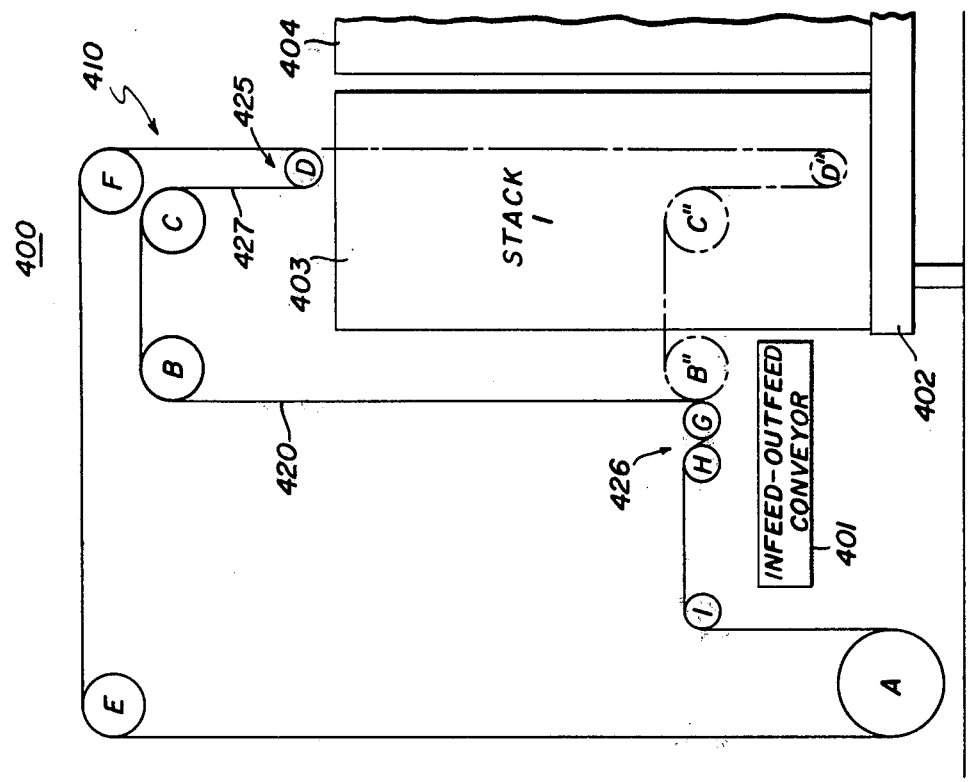
FIG. 15 is a reduced diagrammatic view similar to FIG. 2, and illustrating an alternative arrangement of the infeed-outfeed conveyor with respect to the stacker/unstacker machine.

Referring now to FIG. 15 of the drawings, there is illustrated an alternative arrangement of stacker/unstacker, generally designated by the numeral 300, which is similar to the stacker/unstacker 100, except for the position of the transfer portions of the conveyor path. In the stacker/unstacker 100, the infeed-outfeed conveyor 60 was on the opposite side of the transfer conveyor 110 from the receptacle stack 80. In the stacker/unstacker 300 of FIG. 15, there is provided an infeed-outfeed conveyor 301 which is disposed over a stack storage platform 302 on which are stored a plurality of stacks 303, 304, etc. of receptacles. The stacker/unstacker 300 includes a transfer conveyor 310 comprising continuous chains 320 (one shown) in essentially the same manner as was described above in connection with the stacker/unstacker 100, the conveyor path having a transfer portion 325 disposed adjacent to the top of the receptacle stack in use, and a transfer portion 326 overlying the infeed-outfeed conveyor 301.

The advantages of this arrangement are conservation of space in the storage area and in the vicinity of the stacker/unstacker 300 and also the fact that individual receptacles need only be carried a very short distance between the infeed-outfeed conveyor 301 and the top of the stack. The receptacles never have to traverse the portion of the conveyor path between the sprockets E and F and E and A. In the arrangement of FIG. 15, it will be noted that the guide sprocket I has a large diameter because the individual carrier assemblies undergo a 90-degree change of direction at that portion of the path. It will be understood that the stacker/unstacker 300 is provided with an index mechanism in the same manner as was described above in connection with the stacker/unstacker 100 for moving the transfer portion 325 between the solid line position at the maximum height of the stack and the broken line position at the bottom of the stack in FIG. 15.

Figure 16:
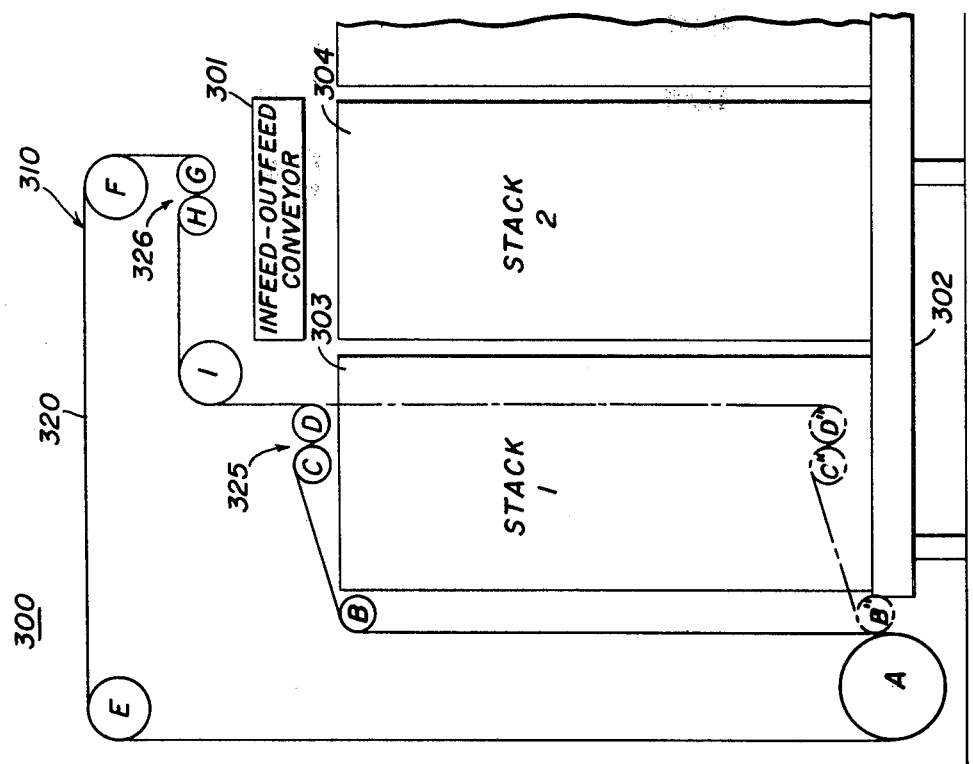
FIG. 16 is a view similar to FIG. 15, and illustrating still another arrangement of the infeed-outfeed conveyor with respect to the stacker/unstacker machine.

Referring now to FIG. 16 of the drawings, there is illustrated still another version of the stacker/unstacker of the present invention, generally designated by the numeral 400, which is characterized by still another arrangement of the infeed-outfeed conveyor with respect to the receptacle stack. More particularly, the stacker/unstacker 400 includes an infeed-outfeed conveyor 401 which is disposed adjacent to the platform 402 for storing stacks 403, 404, etc. of receptacles. In this arrangement, however, instead of being disposed above the stacks, the infeed-outfeed conveyor is disposed adjacent to the bottom of the stack. This arrangement has the advantage of being more compact than the stacker/unstacker 100 and conveying the receptacles over a shorter distance between the stack and the infeed-outfeed conveyor, and also permits the infeed-outfeed conveyor to be disposed at a very low level, which is sometimes desirable.

The stacker/unstacker 400 includes a transfer conveyor 410 which comprises conveyor chains 420 (one shown) movable along a path having a transfer portion 425 adjacent to the top of the stack and a transfer portion 426 immediately overlying the infeed-outfeed conveyor 401. In this arrangement, if the infeed-outfeed conveyor 401 is disposed above the level of the platform 402 on which the bottom of the stack 403 rests, the transfer conveyor 410 must include a height adjustment vertical portion 427 between the sprockets C and D for moving individual receptacles between the transfer portions 425 and 426 when the transfer portion 425 is disposed at the level of the bottom of the stack. This height adjustment portion 427 is unnecessary if the infeed-outfeed conveyor 401 is disposed at the level of the support surface of the platform 402.

While the stacker/unstacker 100 of the present invention has been disclosed for use in stacking and unstacking receptacles such as bread pans or baskets or similar receptacles used in bakery operations, it will be appreciated that it could also be used with other types of receptacles as well as with articles other than receptacles.

From the foregoing, it can be seen that there has been provided a novel stacker/unstacker machine which deposits articles at the top of a stack and removes articles from the top of the stack one at a time without the necessity of moving the entire stack.

There has also been provided a stacker/unstacker machine of the character described, wherein the articles are conveyed through a transfer position at the top of the stack, and including index mechanism for moving the transfer position to follow the top of the stack as the stack height changes.

There has also been provided a continuous chain stacker/unstacker wherein the conveyed articles remain stationary in the transfer position for a predetermined time period while the continuous motion of the conveyor is uninterrupted.

There has also been provided a continuous chain stacker/unstacker wherein receptacle carrier assemblies are pivotally supported between spaced-apart chains which are displaced from one another so as to accommodate translational movement of the receptacle carrier assemblies along the path while avoiding swinging movement of the receptacle carrier assemblies.

There have also been provided several embodiments of receptacle carrier assemblies for supporting different types of magnetizable or non-magnetizable receptacles.

Additionally, there has been provided a stacker/unstacker machine which simultaneously accommodates multiple stacks of receptacles, thereby to permit higher rates of receptacle storage and retrieval than heretofore possible.

There has also been provided a storage system utilizing the stacker/unstacker machines of the present invention, which system does not necessitate handling of the receptacles by the stacker/unstacker machines during recycling of the receptacles.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A machine for feeding articles into a stack and removing articles from a stack, said machine comprising a continuous conveyor for conveying articles to the top of the stack and away from the top of the stack, said conveyor being movable along a path which includes a transfer portion defining an arc of a circle, an article carrier mounted on said conveyor for rotation about the axis of a pivot which is fixed on said conveyor for movement therewith, the pivot axis being parallel to the axis of said circle and spaced from said conveyor path a distance equal to the radius of said circle so as to be coaxial with said circle when the adjacent part of said conveyor is in the transfer portion of the path, said carrier including a frame and magnetic means carried by said frame for movement with respect thereto between a support condition for supporting engagement with a magnetizable portion of an associated article and a release condition, said frame being engageable with the supported article when said magnetic means is moved to its release condition for releasing the article from said means, said transfer portion of said conveyor path being disposed adjacent to the top of the stack so that as the part of said conveyor adjacent to said carrier moves through said transfer portion of said path said carrier and any article supported thereby remain stationary in a transfer position at the top of the stack, and control means for causing said magnetic means and said release means to act between the support and release conditions thereof when said carrier is in the transfer position for depositing a conveyed article at the top of the stack or picking up an article from the top of the stack.

2. A machine for feeding articles into a stack and removing articles from a stack, said machine comprising a continuous conveyor for conveying articles to the top of the stack and away from the top of the stack, said conveyor comprising two laterally spaced-apart parallel endless conveyor members each having a pivot fixed thereon for movement therewith, said conveyor members being respectively movable along parallel paths including transfer portions respectively defining arcs of equal parallel circles, the axes of said pivots being spaced apart and parallel so as to define a plane which remains in a predetermined fixed orientation with respect to the horizontal and the vertical as said conveyor members move along the paths, said axes being parallel to the axes of said circles and respectively spaced from said conveyor member paths a distance equal to the radii of said circles so as to be respectively coaxial with said circles when the adjacent parts of said conveyor members are in said transfer portions of said paths, and an article carrier supported by and between said conveyor members for pivotal movement only with respect to the pivot axes, said carrier including a frame and magnetic means carried by said frame for movement with respect thereto between a support condition for supporting engagement with a magnetizable portion of an associated article and a release condition, said frame being engageable with the supported article when said magnetic means is moved to its release condition for releasing the article from said magnetic means, said transfer portions of said conveyor member paths being disposed adjacent to the top of a stack so that as the parts of said conveyor members adjacent to said carrier move through said transfer portions of said paths said carrier and any article supported thereby remain stationary in a transfer position at the top of a stack, and control means for causing said magnetic means to shift between the support and release conditions thereof when said carrier is in the transfer position for depositing a conveyed article on the top of the stack or picking up an article from the top of the stack, whereby said conveyor is stably held in a fixed position with respect to said plane for only translational movement with respect to said conveyor members along the paths.

3. The machine set forth in claim 2, wherein said conveyor members are spaced apart a distance equal to the distance between the axes of said pivots in a direction parallel to said plane and perpendicular to the axes of said pivots.

4. A machine for feeding articles into a stack and removing articles from a stack, said machine comprising a continuous conveyor including a conveyor chain for conveying articles to the top of the stack and away from the top of the stack, said conveyor being movable along a path which includes a transfer portion defining an arc of a circle, an article carrier mounted on said conveyor for rotation about the axis of a pivot which is fixed on said conveyor for movement therewith, the pivot axis being parallel to the axis of said circle and spaced from said conveyor path a distance equal to the radius of said circle so as to be coaxial with said circle when the adjacent part of said conveyor is in the transfer portion of the path, said carrier including magnetic means movable between a support condition for supporting an associated article thereon and a release condition for releasing the associated article, said transfer portion of said conveyor path being disposed adjacent to the top of the stack so that as the part of said conveyor adjacent to said carrier moves through said transfer portion of said path said carrier and any article supported thereby remain stationary in a transfer position at the top of the stack, control means for causing said magnetic means to move between the support and release conditions thereof when said carrier is in the transfer position for depositing a conveyed article on the top of the stack or picking up an article from the top of the stack, and indexing mechanism coupled to said conveyor for vertically varying the position of said transfer portion of said path without changing the overall length of said path, said indexing mechanism including a movable frame having pinion means thereon, two sprockets carried by said movable frame and respectively engageable with said chain along opposite sides thereof for defining said transfer portion of said path, and vertically extending rack means disposed in meshing engagement with said pinion means for guiding the vertical movement of said movable frame to adjust the vertical position of said transfer portion of said path, said indexing mechanism being responsive to the addition of an article to the top of the stack for raising said transfer portion of said path a distance equal to the increase in the height of the stack, said indexing mechanism being responsive to the removal of an article from the top of the stack for lowering said transfer portion of said path a distance equal to the decrease in the height of the stack, whereby articles may be added to and removed from the top of the stack without movement of the stack.

5. The machine set forth in claim 4, and further comprising release means adapted for cooperation with said magnetic means for breaking the magnetic attraction between said magnetic means and the magnetizable portion of the associated article.

6. The machine set forth in claim 4, wherein said conveyor includes a conveyor chain, a first sprocket engageable along a predetermined arc thereof with said chain for defining said transfer portion of said path, and a second sprocket engageable with said chain and cooperating with said first sprocket to determine the extent of said predetermined arc.

7. A machine for feeding articles into a stack and removing articles from a stack, said machine comprising an infeed-outfeed conveyor for conveying articles to and from a transfer region, a continuous transfer conveyor for conveying articles from said infeed-outfeed conveyor to the top of the stack and away from the top of the stack to said infeed-outfeed conveyor, said transfer conveyor being movable along a path which includes first and second transfer portions respectively defining arcs of first and second circles and having parallel axes and equal radii, an article carrier mounted on said transfer conveyor for rotation about the axis of a pivot which is fixed on said conveyor for movement therewith, the pivot axis being parallel to the axes of said circles and spaced from said transfer conveyor path a distance equal to the radii of said circles so as to be coaxial with said circles when the adjacent part of said transfer conveyor is in the first and second transfer portions of the path, said carrier including a frame and magnetic means carried by said frame for movement with respect thereto between a support condition for supporting engagement with a magnetizable portion of an associated article and a release condition, said frame being engageable with the supported article when said magnetic means is moved to its release condition for releasing the article from said magnetic means, said first transfer portion of said transfer conveyor path being disposed adjacent to the top of the stack so that as the part of said transfer conveyor adjacent to said carrier moves through said first transfer portion of said path said carrier and any article supported thereby remain stationary in a first transfer position at the top of the stack, first control means for causing said magnetic means to move between the support and release conditions thereof when said carrier is in the first transfer position for depositing a conveyed article on the top of the stack and picking up an article from the top of the stack, said second transfer portion of said transfer conveyor path being disposed adjacent to said infeed-outfeed conveyor so that as the part of said transfer conveyor adjacent to said carrier moves through said second transfer portion of said path said carrier and any article supported thereby remain stationary in a second transfer position overlying said infeed-outfeed conveyor, and second control means for causing said magnetic means to move between the support and release conditions thereof when said carrier is in the second transfer position for depositing a conveyed article on said infeed-outfeed conveyor or for picking up an article from said infeed-outfeed conveyor.

8. The machine set forth in claim 7, wherein said infeed-outfeed conveyor is disposed above the maximum height of the stack.

9. The machine set forth in claim 7, wherein said infeed-outfeed conveyor is disposed below the maximum height of the stack.

10. The machine set forth in claim 7, wherein said transfer conveyor path forms a continuous closed loop, said infeed-outfeed conveyor and the article stack being respectively disposed substantially on opposite sides of said loop.

11. The machine set forth in claim 7, wherein said transfer conveyor path forms a continuous closed loop, said infeed-outfeed conveyor and the article stack being disposed substantially on the same side of said loop.

* * * * *